(12) United States Patent
Ikeda et al.

(10) Patent No.: US 8,267,131 B2
(45) Date of Patent: Sep. 18, 2012

(54) STUDLESS TIRE

(75) Inventors: Akio Ikeda, Kobe (JP); Noriko Kishimoto, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 1249 days.

(21) Appl. No.: 12/068,949

(22) Filed: Feb. 13, 2008

(65) Prior Publication Data

US 2008/0202658 A1    Aug. 28, 2008

(30) Foreign Application Priority Data

Feb. 22, 2007  (JP) ................................. 2007-042595

(51) Int. Cl.
*B60C 11/11*    (2006.01)
*B60C 11/12*    (2006.01)
(52) U.S. Cl. ......... 152/209.18; 152/209.25; 152/209.27; 152/902; 152/DIG. 3
(58) Field of Classification Search ............. 152/209.16, 152/209.18, 209.25, 209.27, 902, DIG. 3; D12/592, 594, 595, 598, 600, 601
See application file for complete search history.

(56) References Cited

U.S. PATENT DOCUMENTS

| 4,545,415 A | * | 10/1985 | Lindner et al. ............. 152/209.1 |
| 4,823,855 A | * | 4/1989 | Goergen et al. .......... 152/209.18 |
| 7,137,424 B2 | | 11/2006 | Hino |
| 2006/0032566 A1 | * | 2/2006 | Koya ........................ 152/209.18 |
| 2007/0089821 A1 | | 4/2007 | Kishizoe |
| 2008/0196808 A1 | * | 8/2008 | Ikeda et al. .............. 152/209.24 |

FOREIGN PATENT DOCUMENTS

| DE | 19826927 | * | 12/1998 |
| EP | 1 630 007 A1 | | 3/2006 |
| JP | 05-139120 | * | 6/1993 |
| JP | 2001-191739 | * | 7/2001 |
| JP | 2003-63211 A | | 3/2003 |
| JP | 2006-232151 A | | 9/2006 |

* cited by examiner

*Primary Examiner* — Steven D Maki
*Assistant Examiner* — Robert Dye
(74) *Attorney, Agent, or Firm* — Birch, Stewart, Kolasch & Birch, LLP

(57) ABSTRACT

A studless tire capable of exhibiting excellent performances on both icy road and snow-covered road, including tread portion 2 having a pair of middle circumferential grooves 3b each extending in a region between 15% and 25% of tread width TW from tire equator C to provide crown region CR between the middle grooves 3b and a pair of shoulder regions Sh between the middle groove 3b and ground contact edge E, wherein the crown region CR includes rows R1, R2 of blocks B having sipes S and defined by zigzag inner circumferential grooves 3a and crown lateral grooves 4a, 4b, each shoulder region Sh includes rows R3, R4 of blocks B having sipes S and defined by linear outer circumferential grooves 3c and shoulder lateral grooves 4c, 4d, and groove area rate Gs (%) of shoulder regions Sh is larger than groove area rate Gc (%) of crown region CR so that the difference (Gs−Gc) is from 3 to 7%.

7 Claims, 7 Drawing Sheets

STUDLESS TIRE

BACKGROUND OF THE INVENTION

The present invention relates to a studless tire having a plurality of block rows in the tread portion, and more particularly to a studless tire having both excellent on-the-ice performances and excellent on-the-snow performances.

Various studless tires suitable for traveling on icy and snow-covered roads have been proposed, for example, in JP-A-2003-63211. A plurality of blocks provided with sipes are formed in the tread portion of studless tires. The coefficient of friction between the blocks and an icy road is enhanced by the edges of sipes. The sipes also serve to absorb water on an icy road. By a synergistic action of them, studless tires can exhibit both high driving force and high braking force on an icy road.

However, it is not easy to achieve both excellent on-the-ice performances (performances on an icy road) and excellent on-the-snow performances (performances on a snow-covered road) even by studless tires. A reason is that it is effective for running on an icy road to increase the ground contact area to thereby increase the frictional force, but it is required for running on a snow-covered road to increase the groove area to thereby enhance the snow-expelling performance. These requirements are contradictory to each other.

Accordingly, it is an object of the present invention to provide a winter tire called studless tire which have both excellent on-the-ice performances and excellent on-the-snow performances.

This and other objects of the present invention will become apparent from the description hereinafter.

SUMMARY OF THE INVENTION

It has been found that the above-mentioned object can be achieved by making the rate Gs (%) of a groove area in a shoulder region of a tread portion of a tire larger than the rate Gc (%) of a groove area in a crown region of the tread portion so that the difference (Gs−Gc) between them falls within a specific range.

In accordance with the present invention, there is provided a studless tire including a tread portion having (1) a pair of middle circumferential grooves extending continuously in the circumferential direction of tire on both sides of the tire equator so that the center line of each groove is located in a region of 15 to 25% of the tread width from the tire equator and said middle circumferential grooves provide a crown region between them and a pair of shoulder regions between each of said middle circumferential grooves and each of ground contact edges; (2) at least one inner circumferential groove extending continuously in the circumferential direction in a zigzag form in said crown region located axially inward of said pair of middle circumferential grooves; (3) and at least one outer circumferential groove extending continuously and linearly in the circumferential direction in each of said pair of shoulder regions;

wherein said crown region is provided with at least two rows of crown blocks which are defined by said at least one inner circumferential groove and a plurality of crown lateral grooves extending in a direction intersecting said inner circumferential groove and in which said crown blocks have sipes and in each row a plurality of blocks are arranged in the tire circumferential direction; each of said pair of shoulder regions are provided with at least two rows of shoulder blocks which are defined by said at least one outer circumferential groove and a plurality of shoulder lateral grooves extending in a direction intersecting said outer circumferential groove and in which said shoulder blocks have sipes and in each row a plurality of blocks are arranged in the tire circumferential direction; and the rate Gs (%) of a groove area in said shoulder regions is larger than the rate Gc (%) of a groove area in said crown region so that the difference (Gs−Gc) between them is from 3 to 7%.

Preferably, each of the middle, inner and outer circumferential grooves has an axial width within the range of 1.0 to 10.0 mm, and the groove width Tg3 of the outer circumferential groove is larger than the groove width Tg1 of the inner circumferential groove.

Preferably, each of the crown and shoulder lateral grooves has a width within the range of 3.0 to 10.0 mm measured in the circumferential direction, and the groove width of the shoulder lateral groove is larger than the groove width of the crown lateral groove.

Preferably, the crown and shoulder lateral grooves extend at an angle of 0 to 45° with respect to the axial direction, and the angle of the shoulder lateral grooves is smaller than the angle of the crown lateral grooves.

Preferably, the groove width of the middle circumferential grooves is from 1.0 to 4.0 mm and is smaller than the groove widths of the inner and outer circumferential grooves. Preferably, the crown lateral grooves and the shoulder lateral grooves, which are located axially both sides of each of the middle circumferential grooves, are disposed so as to communicate with each of the middle circumferential grooves alternately in the circumferential direction.

The middle circumferential grooves may have varied widths in the circumferential direction, and have the maximum groove width at locations where the crown lateral grooves communicate with the middle circumferential grooves.

In an embodiment of the present invention, a pair of the inner circumferential grooves are disposed on axially both sides of the tire equator to provide a center crown block row extending on the tire equator and a pair of side crown block rows disposed on the both sides of the center crown block row, and the inclination angle θ1 of center crown lateral grooves disposed in the center crown block row with respect to the axial direction is smaller than the inclination angle θ2 of side crown lateral grooves disposed in the side crown block rows with respect to the axial direction.

Since an icy road has a low frictional coefficient, a front-back force and a lateral force, which act on a tire during braking and cornering of a vehicle, are small and, therefore, the flexure of tire during running is small and mainly the crown region of the tread portion of the tire comes into contact with the icy road surface. In the present invention, the groove area percentage of the crown region is made smaller than the groove area percentage of the shoulder regions to secure a large ground contact area in the crown region, thereby enhancing the frictional force to improve icy road performances. Further, since the crown region is provided with an inner circumferential groove continuously extending in a zigzag form in the circumferential direction, the frictional force is further enhanced by the edges thereof.

On the other hand, since the frictional coefficient of a snow-covered road is higher than that of an icy road and since the road surface is easy to cave in by vehicle weight, the ground contact pressure is apt to become large up to the shoulder regions of the tread portion. In the present invention, the groove area percentage of the shoulder regions is larger than the groove area percentage of the crown region, the snow-expelling performance is enhanced to improve snow-covered road performances without impairing the icy road performances. Further, since the shoulder regions are provided with outer circumferential grooves continuously and linearly extending in the circumferential direction, the snow-expelling performance is further enhanced thereby.

These effects of the present invention can be surely exhibited by forming grooves so that the difference (Gs−Gc) of the groove area rate Gs (%) in the shoulder regions from the groove area rate Gc (%) in the crown region is 3% or more. Moreover, since the difference (Gs−Gc) is controlled to 7% or less, an excessive difference in pattern rigidity is prevented from occurring between the crown region and the shoulder regions, whereby uneven wear can be prevented from occurring.

DETAILED DESCRIPTION OF THE INVENTION

An embodiment of the present invention will now be explained with reference to the accompanying drawings.

Figure 1:
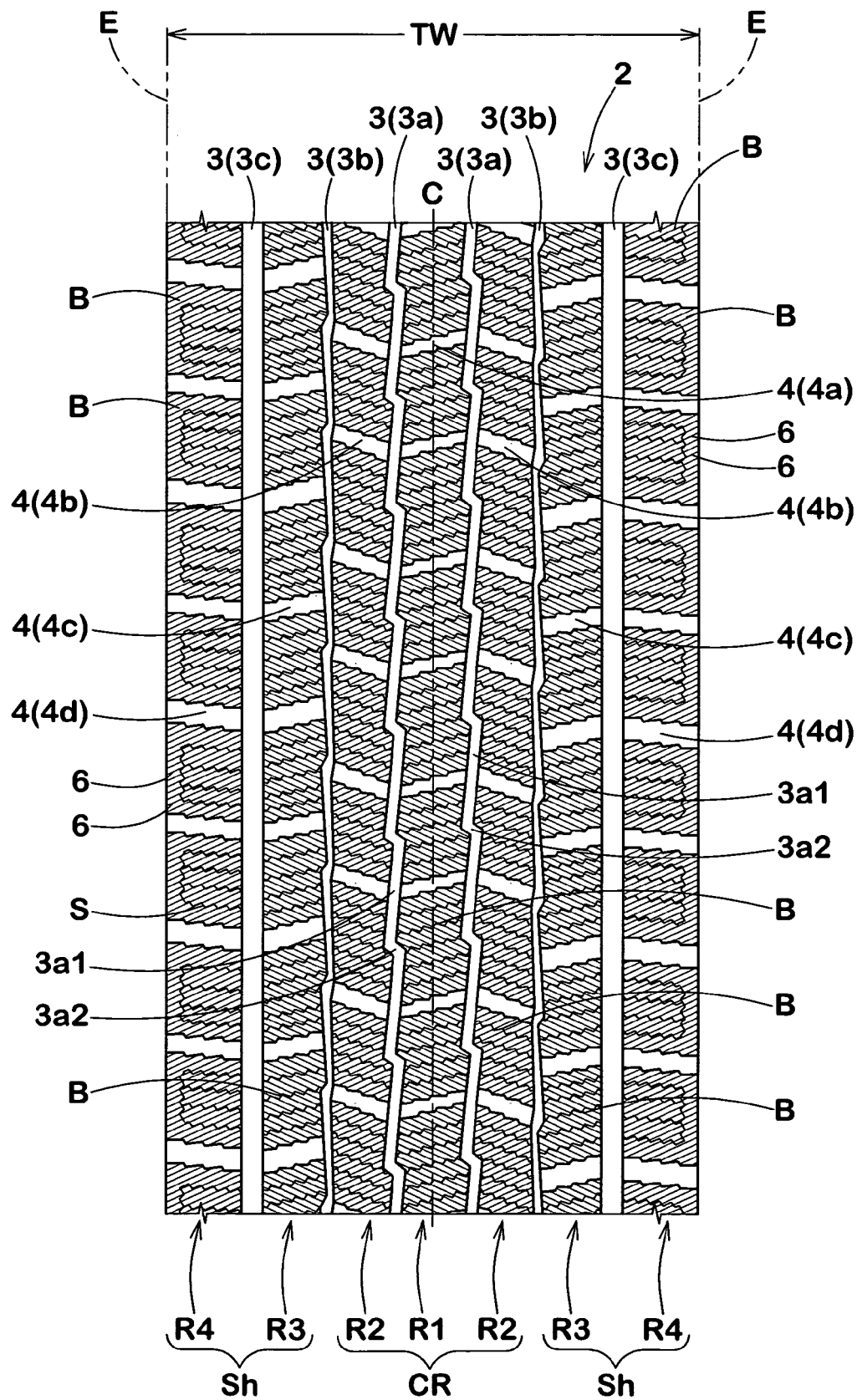
FIG. 1 is a development of a tread pattern illustrating an embodiment of the present invention.
Figure 2:
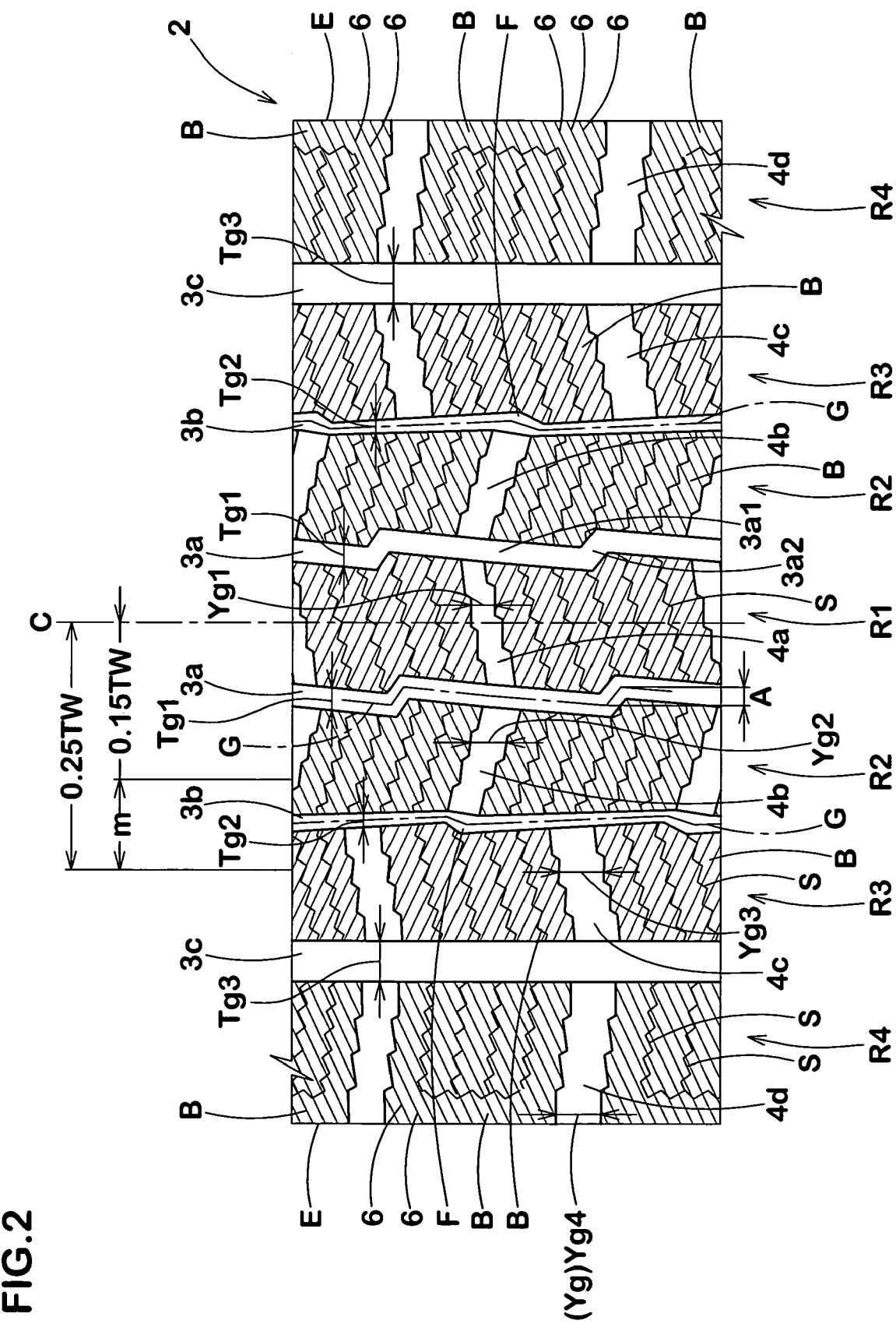
FIG. 2 is an enlarged view of a part of FIG. 1.

FIG. 1 is a development of a tread portion 2 of a studless tire (the entire of which is not shown) illustrating an embodiment of the present invention, and FIG. 2 is a partial enlarged view thereof.

Between ground contact edges E, E of the tread portion 2 are provided a plurality of circumferential grooves 3 extending continuously in the circumferential direction of tire and a plurality of lateral grooves 4 extending in a direction intersecting the circumferential grooves 3.

The circumferential grooves 3 include a pair of middle circumferential grooves 3b extending continuously in the circumferential direction of tire on both sides of the tire equator C. The center line of each of the middle grooves 3b is located in a region "m" between 15% and 25% of the tread width TW from the tire equator C, in other words, in a region "m" having boundaries separated from the tire equator C by distances of 0.15 TW and 0.25 TW. The tread portion 2 is divided by the middle circumferential grooves 3b, 3b into a crown region CR between them and a pair of shoulder regions Sh, Sh between each of the middle circumferential grooves 3b, 3b and each of ground contact edges E, E.

The term "tread width TW" as used herein means an axial distance between the ground contact edges E, E of the tread portion 2 of a tire that contacts a flat surface when the tire is mounted on a standard rim and inflated to a normal inner pressure and the tire in such a standard state is then loaded with a normal load. By the way, the dimensions of respective parts or portions of a tire denote values measured in the standard state, unless otherwise noted.

The term "standard rim" denotes a rim defined for every tire in a standardizing system on which the tire is based and is, for example, "standard rim" in JATMA, "Design Rim" in TRA and "Measuring Rim" in ETRTO.

The term "normal inner pressure" denotes an air pressure defined for every tire in the standardizing system and is, for example, the "maximum air pressure" in JATMA, the maximum value recited in the table of "Tire Load Limits at Various Cold Inflation Pressures" in TRA, and the "Inflation Pressure" in ETRTO", provided that in case of tires for passenger cars, the "normal inner pressure" is 180 kPa.

The term "normal load" denotes a load defined for every tire in the standardizing system and is, for example, the maximum load capacity in JATMA, the maximum value recited in the table of "Tire Load Limits at Various Cold Inflation Pressures" in TRA, and the "Load Capacity" in ETRTO, provided that in case of tires for passenger cars, the "normal load" is a load of 88% of the load defined above.

The lateral grooves 4 include center crown lateral grooves 4a extending across between the inner circumferential grooves 3a, 3a, side crown lateral grooves 4b extending across between the inner circumferential groove 3a and the middle circumferential groove 3b, inner shoulder lateral grooves 4c extending across between the middle circumferential groove 3b and the outer circumferential groove 3c, and outer shoulder lateral grooves 4d extending across between the outer circumferential groove 3c and the ground contact edge E. The lateral grooves 4a to 4d in this embodiment shown in the drawings have groove walls formed into a zigzag form. The zigzag groove wall is helpful in enhancing a grip on an icy road since the length of the edges of lateral grooves 4a to 4d are increased.

Rows of blocks B arranged in the circumferential direction of tire are formed in the crown region CR and the shoulder regions Sh by these circumferential grooves 3 and lateral grooves 4. In this embodiment shown in the drawings are provided seven block rows R1 to R4. The crown region CR is provided with three block rows comprising a center crown block row R1 extending on the tire equator C and a pair of side crown block rows R2, R2 disposed on the both sides of the center row R1. Each of the shoulder regions Sh is provided with two block rows comprising an inner shoulder block row R3 disposed on the tire equator C side and an outer shoulder block row R4 disposed on the ground contact edge E side (axially outermost side). In this embodiment, the maximum width W1 in the axial direction of the center crown block row R1 is larger than the maximum width W2 in the axial direction of the side crown block row R2.

The crown region CR is provided with at least one inner circumferential groove 3a extending continuously in the circumferential direction in a zigzag form (in the embodiment shown in the drawings, a pair of the inner circumferential grooves 3a, 3a which are disposed on the both sides of the tire equator C). Each of the shoulder regions Sh is provided with at least one outer circumferential groove 3c extending continuously in the circumferential direction in a straight line form (in the embodiment shown in the drawings, one outer circumferential groove 3c). These circumferential grooves 3a to 3c are disposed at locations which are substantially line-symmetric with respect to the tire equator C.

Figure 3:
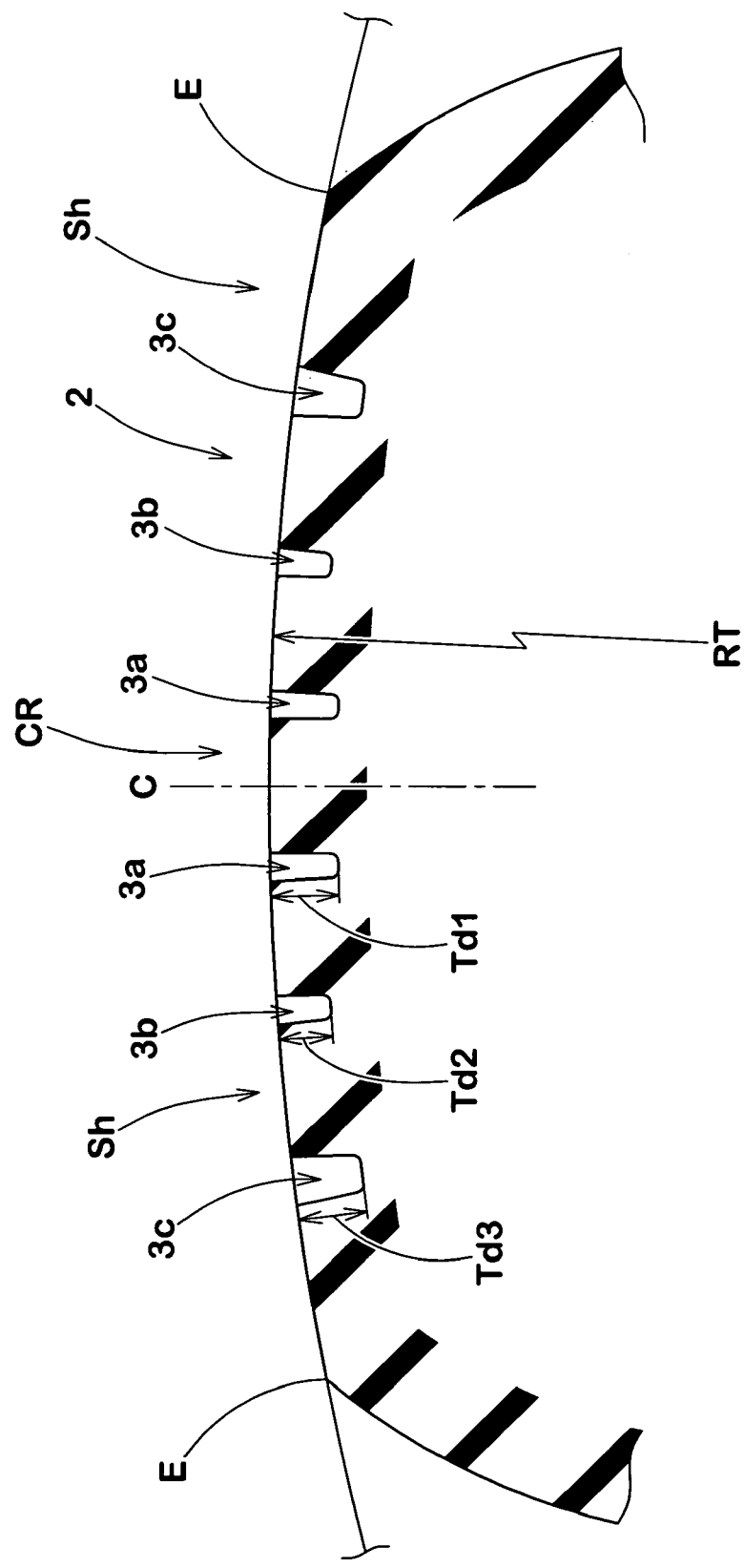
FIG. 3 is a cross sectional view of the profile of a tread portion of a tire according to the present invention.

The zigzag inner circumferential groove 3a is advantageous in that a grip on an icy road, especially a grip in cornering, is enhanced since a zigzag groove has a longer groove edge than a straight groove. In particular, since an icy road has a low frictional coefficient, a front-back force and a lateral force, which act on a tire during braking and cornering of a vehicle, are small and, therefore, the flexure of tire is small. Also, as shown in FIG. 3, in case of a studless tire for passenger car, the outer surface (profile line specified when grooves are filled up) of the tread portion 2 in cross section of the tire in the standard state including the tire rotation axis is in a smooth arc-like form which is radially outwardly convex, and has a radius of curvature RT of about 400±100 mm. Therefore, the ground contact pressure of the crown region CR located between the middle circumferential grooves 3b, 3b which are disposed in the above-mentioned regions "m" is high on an icy road. Therefore, arrangement of the zigzag inner circumferential groove 3a in such a crown region CR showing a high ground contact pressure when running on an icy road is particularly effective for enhancing the on-the-ice performances. Preferably, the middle circumferential grooves 3b, 3b are also formed into a zigzag form, as in this embodiment shown in the drawings.

In order to prevent marked lowering of the rigidity of blocks B in the circumferential direction in the crown region CR and clogging of circumferential grooves 3a and 3b with snow, it is desirable that the amplitude of a zigzag of the inner and/or middle circumferential grooves is as small as possible. For example, as shown in FIG. 2, at a groove center line G of the zigzag circumferential groove 3a or 3b, the amplitude A from peak to peak in the axial direction is preferably from 2 to 4 mm.

Figure 4:
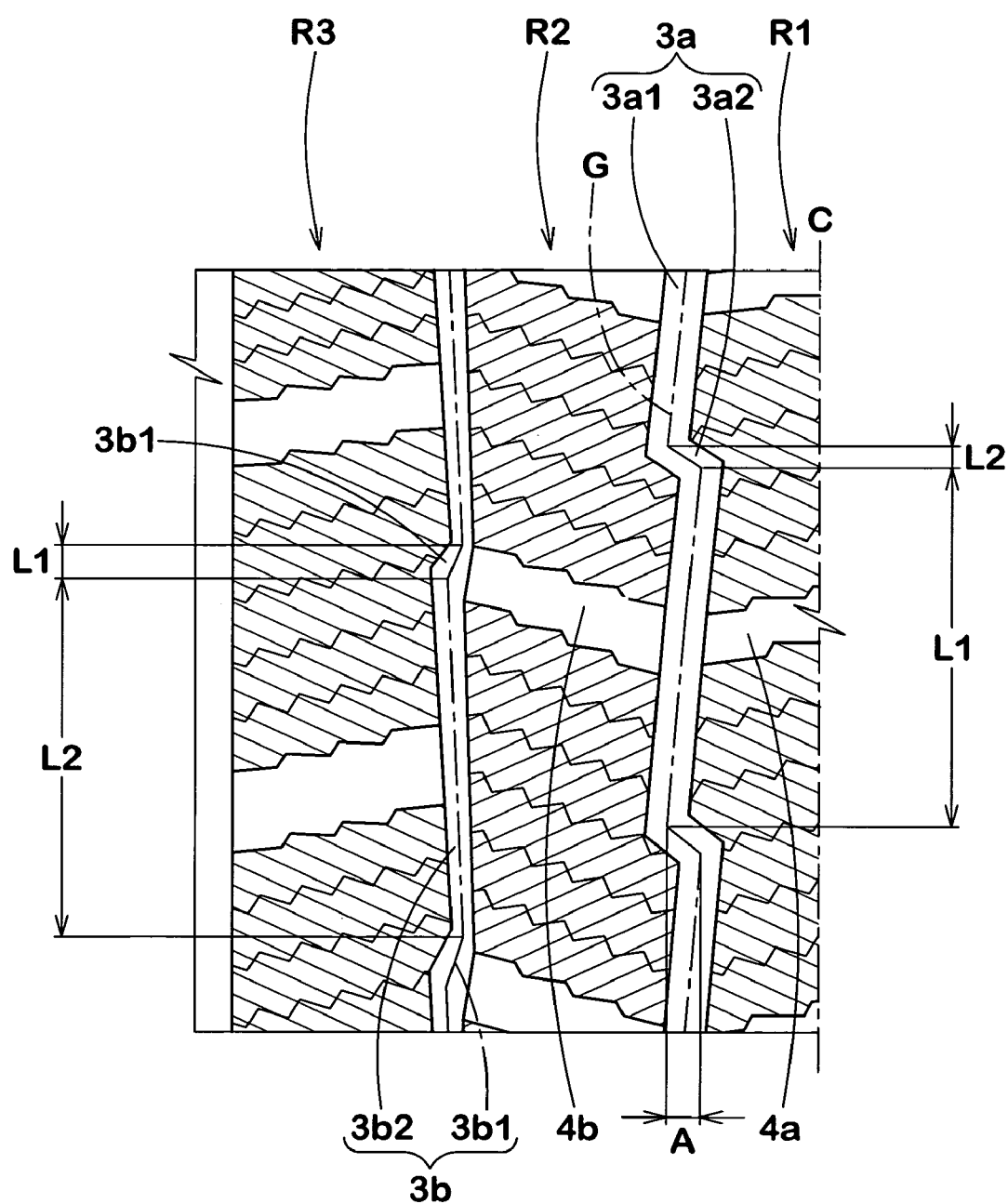
FIG. 4 is a partial enlarged view showing crown block rows as shown in FIG. 1.

As shown in FIG. 4 in an enlarged form, inner circumferential grooves 3a in this embodiment are formed in a zigzag shape such that it comprises upward-sloping components 3a1 (components extending diagonally right up) and downward-sloping components 3a2 (components extending diagonally right down) when viewed from above, and these components 3a1 and 3a2 are disposed alternately. The circumferential length L1 of the upward-sloping components 3a1 is longer than the circumferential length L2 of the downward-sloping components 3a2, but L1<L2 is of course acceptable.

As stated above, if the amplitude A of a zigzag of the circumferential grooves is made small, the corner angle of the zigzag (bending angle at corners) approaches 180° when the zigzag is a simple zigzag shape like L1=L2 and, therefore, sufficient edge effect and effect of pressing snow into a column are not obtained. In contrast, when the lengths of the inclining components of a zigzag are differentiated from each other as in the embodiment shown in the drawings, corner portions of the zigzag can be formed at a relatively small angle. This is helpful, for example, in obtaining a high grip on a snow-covered road since snow is effectively pressed into a column and is sheared by a shorter component of the zigzag (in this embodiment, downward-sloping components 3a2). In particular, it is preferable that the L1/L2 ratio of the inner circumferential groove 3a is at least 8, especially at least 12 and is at most 22, especially at most 18.

On the other hand, such an inner circumferential groove 3a is apt to bring about staggering or sideslipping of a vehicle at the time of braking, since the pattern rigidity may be unbalanced by influence of a long upward-sloping components 3a1. Thus, in this embodiment, the middle circumferential grooves 3b adjacent to the inner circumferential grooves 3a are formed into a zigzag form such that downward-sloping components 3b2 have a larger length L2 than the length L1 of upward-sloping components 3b1. Like this, the pattern rigidity of the inner circumferential groove 3a can be balanced by increasing the proportion of the downward-sloping components 3b2 of the middle circumferential grooves 3b. Thus, staggering or sideslipping of a vehicle in braking can be more surely suppressed. In order to effectively exhibit such an action, it is preferable that the L2/L1 ratio of the middle circumferential grooves 3b is within the range of ±10% of the above-mentioned L1/L2 ratio of the inner circumferential groove 3a.

The outer circumferential grooves 3c are formed into a straight line form which linearly extends in the circumferential direction. Since the frictional coefficient of a snow-covered road is higher than that of an icy road and since the snow-covered road surface is easy to cave in by vehicle weight, the ground contact pressure is apt to become large even the shoulder regions Sh of the tread portion. The snow-expelling performance can be enhanced to enhance the on-the-snow performances by forming the outer circumferential grooves 3c extending in such shoulder regions Sh into a straight line form.

In the studless tire of the present invention, the groove area rate Gs (%) in the shoulder regions Sh and the groove area rate Gc (%) in the crown region CR are determined so that the groove area rate Gs (%) is larger than the groove area rate Gc (%) and the difference (Gs−Gc) falls within the range of 3 to 7%.

The groove area rate Gc (%) of the crown region CR is obtained by the following equation (1):

$$Gc(\%)=(Agc/Acc)\times 100 \qquad (1)$$

wherein Agc is a total value of areas at the tread surface of all circumferential grooves 3 and lateral grooves 4 which are included in the crown region CR surrounded by the axially inner edges of the middle circumferential grooves 3b, 3b, and Acc is the surface area of the crown region CR in the state that all grooves, sipes, incisions and the like are filled up. The area of sipes S shown in the drawings is not included in the total value Agc.

Similarly, the groove area rate Gs (%) of the shoulder region Sh is obtained by the following equation (2):

$$Gs(\%)=(Ags/Acs)\times 100 \qquad (2)$$

wherein Ags is a total value of areas at the tread surface of all circumferential grooves 3 and lateral grooves 4 which are included in a shoulder region Sh surrounded by the axially outer edge of a middle circumferential groove 3b and the ground contact edge E, and Acs is the surface area of the shoulder region Sh in the state that all grooves, sipes, incisions and the like are filled up. The area of sipes S shown in the drawings is not included in the total value Ags.

Like this, in the present invention, the groove area rate Gc of the crown region CR is made smaller than the groove area rate Gs of the shoulder regions Sh, whereby a large ground contact area is secured in the crown region CR to increase the frictional force on an icy road, thus improving a grip or a braking force on an icy road. On the other hand, since the groove area rate Gs of the shoulder regions Sh is larger than the groove area rate Gc of the crown region CR, the snow-expelling performance is enhanced and accordingly sufficient driving and braking forces can be exhibited on a snow-covered road. Thus, the studless tires according to the present invention have both high levels of on-the-ice performances and on-the-snow performances.

If the difference (Gs−Gc) between the groove area rate Gs (%) of the shoulder regions Sh and the groove area rate Gc (%) of the crown region CR is too small, the above-mentioned effects are not expected. Therefore, the difference (Gs−Gc) is required to be at least 3% in the present invention in order to surely exhibit the above-mentioned effects. If the difference (Gs−Gc) is too large, uneven wear is easy to occur since a large difference in pattern rigidity may occur between the crown region CR and the shoulder regions Sh. Therefore, it is preferable that the difference (Gs−Gc) is at most 7%, especially from 4 to 5%.

The values of the groove area rate Gc and the groove area rate Gs are not particularly limited. However, if they are excessively large, there is a possibility that the frictional force on an icy road is lowered to deteriorate the on-the-ice performances. On the other hand, if the groove area rate Gc of the crown region CR is excessively small, on-the-snow performances tend to be deteriorated. From such points of view, it is preferable that the groove area rate Gc of the crown region CR is at least 25%, especially at least 27%, and is at most 33%, especially at most 31%. Similarly, it is preferable that the groove area rate Gs of the shoulder regions Sh is at least 30%, especially at least 32%, and is at most 36%, especially at most 34%.

The groove area rate of the whole of the tread portion 2 is also not particularly limited, but it is preferably at least 28%, more preferably at least 30% and is preferably at most 34%, more preferably at most 32%.

From the viewpoint of exhibiting a sufficient cornering performance on a snow-covered road, it is preferable that each of groove widths Tg1 to Tg3 of the circumferential grooves 3a to 3c measured in the axial direction is at least 1.0 mm, especially at least 2.0 mm. On the other hand, from the viewpoint of sufficiently securing the pattern rigidity of the tread portion 2 to enhance the wear resistance, it is preferable that each of groove widths Tg1 to Tg3 of the circumferential grooves 3 is at most 10.0 mm, especially at most 8.0 mm. From the same viewpoints, it is preferable that each of groove depths Td1 to Td3 of the circumferential grooves 3 is at least 9.0 mm, especially at least 9.5 mm, and is at most 11.0 mm, especially at most 10.5 mm.

The width Tg1 of the inner circumferential groove 3a, the width Tg2 of the middle circumferential groove 3b and the width Tg3 of the outer circumferential groove 3c may be the same or different. In a preferable embodiment, these widths are varied. For example, since it is desired to increase the ground contact area of the crown region CR when running on an icy road, the inner circumferential groove 3a and the middle circumferential groove 3b are formed to have smaller groove widths Tg1 and Tg2 than the groove width Tg3 of the outer circumferential groove 3c. This is advantageous in effectively enhancing the snow-expelling performance in the shoulder regions Sh at the time of cornering on a snow-covered road.

From such a point of view, it is preferable that the groove width Tg1 of the inner circumferential groove 3a is at least 1.0 mm, especially at least 2.0 mm, and is at most 5.0 mm, especially at most 4.0 mm. Further, it is preferable that the groove width Tg3 of the outer circumferential groove 3c is at least 6.0 mm, especially at least 6.5 mm, and is at most 10.0 mm, especially at most 8.0 mm.

In the embodiment shown in the drawings, the middle circumferential grooves 3b are formed to have a groove width Tg2 smaller than the groove width Tg1 of the inner circumferential groove 3a, although the grooves in the present invention are not limited to grooves having such a relationship. Formation of such middle grooves 3b is effective for increasing the area of a land portion of the crown region CR. It is preferable that the groove width Tg2 of the middle circumferential grooves 3b is at least 1.0 mm, especially at least 2.0 mm, and is at most 4.0 mm, especially at most 3.0 mm.

In the embodiment shown in the drawings, side crown lateral grooves 4b communicate with middle circumferential groove 3b from the axially inner side thereof, and inner shoulder lateral grooves 4c communicate with the middle circumferential groove 3b from the axially outer side thereof. It is preferable that the communicating positions for the side crown lateral grooves 4b and the communicating positions for the inner shoulder lateral grooves 4c appears alternately in the circumferential direction of tire. That is to say, only T-shaped groove-intersecting portions are provided in the middle circumferential grooves 3b without forming any cross-shaped intersecting portion. In general, a portion which is located between the crown region CR and the shoulder region Sh and in which the middle circumferential groove 3b is disposed, is large in load variation owing to a deformation resulting from ground contact and ground non-contact and a slip angle and, therefore, strain is easy to concentrate thereon. However, when the above-mentioned arrangement of lateral grooves 4b and 4c is applied, concentration of a large strain on the middle circumferential groove 3b is prevented to thereby suppress occurrence of uneven wear starting from the middle circumferential groove 3b, since the middle circumferential groove 3b is supported by blocks B disposed in zigzag alignment on the both sides of the groove 3b.

Further, as shown in FIG. 2, it is preferable that the middle circumferential grooves 3b have a width Tg2 varied in the circumferential direction, and have the maximum groove width at locations F where the side crown lateral grooves 4b communicate with the middle circumferential grooves 3b. Since the side crown lateral grooves 4b are formed to have a smaller groove width than the shoulder lateral grooves 4c, communicating portions between the side crown lateral grooves and the middle circumferential groove 3b tend to be easily clogged with snow, but the clogging with snow can be effectively prevented by providing a sufficient space to the communicating portions in such a manner.

In order to exhibit a high driving force on a snow-covered road, the groove widths Yg1, Yg2, Yg3 and Yg4 of respective lateral grooves 4a, 4b, 4c and 4d measured in the circumferential direction are preferably at least 3.0 mm, more preferably at least 3.5 mm. On the other hand, in order to prevent the area of land portions from lowering to thereby enhance the frictional force on an icy road, the groove widths Yg1 to Yg4 are preferably at most 10.0 mm, more preferably at most 9.0 mm.

It is particularly preferable that the groove widths Yg1 and Yg2 of the center crown lateral grooves 4a and the side crown lateral grooves 4b are from 3 to 7 mm, the groove widths Yg3 and Yg4 of the inner and outer shoulder lateral grooves 4c and 4d are from 3 to 10 mm, and they are selected so that the groove widths Yg3 and Yg4 of the shoulder lateral grooves are larger than the groove widths Yg1 and Yg2 of the crown lateral grooves. It is more preferable that the groove widths Yg are gradually increased from the center crown lateral grooves to the outer shoulder lateral grooves (i.e., Yg1<Yg2<Yg3<Yg4), whereby both on-the-ice performances and on-the-snow performances are further improved.

The depth of the lateral grooves 4 is preferably from 85 to 100% of the depth of the circumferential grooves 3.

The inclination angles θ of the respective lateral grooves 4 with respect to the axial direction are not particularly limited. However, if the angle θ is too large, there is a possibility that a driving force for straight running is not sufficiently obtained on an icy road. Further, the rigidity in the circumferential direction of the blocks B is easy to lower, so uneven wear is easy to occur in an early stage of use. From such points of view, the angle θ of the lateral grooves 4 with respect to the axial direction is preferably at most 45°, more preferably at most 40°.

Figure 5:
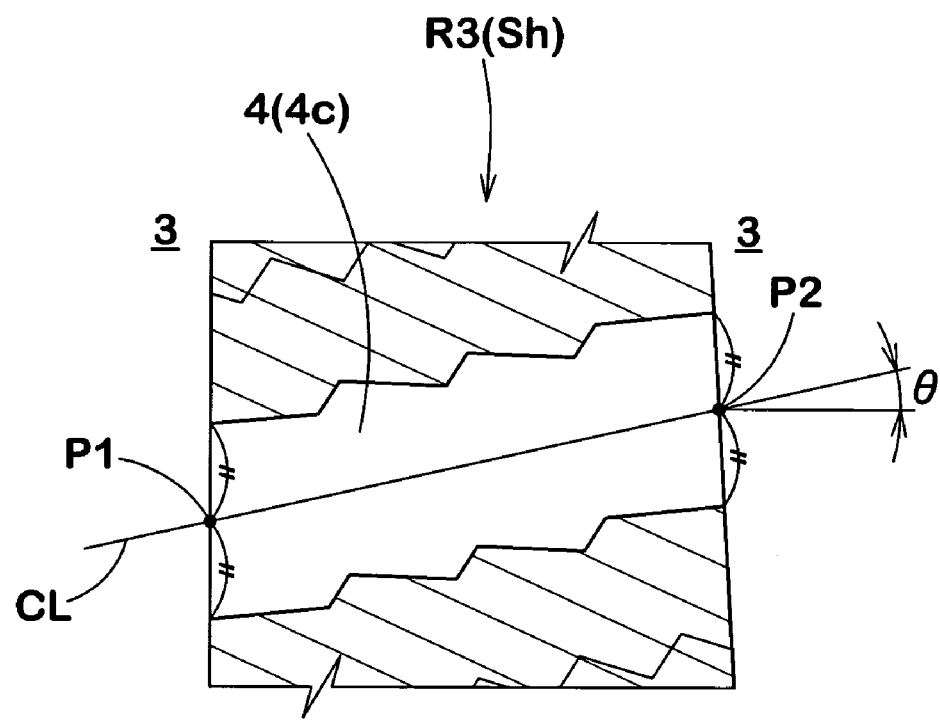
FIG. 5 is a partial enlarged view of a lateral groove as shown in FIG. 1.

Here, the "angle θ of the lateral grooves 4 with respect to the axial direction" denotes, as shown in FIG. 5 in an enlarged form, an angle of a straight line CL connecting middle points P1 and P2 of both axial ends of a lateral groove 4 (end portions which open to the circumferential grooves 3 or which open to the circumferential groove 3 and the ground contact edge E) with respect to the axial direction of tire.

Figure 6:
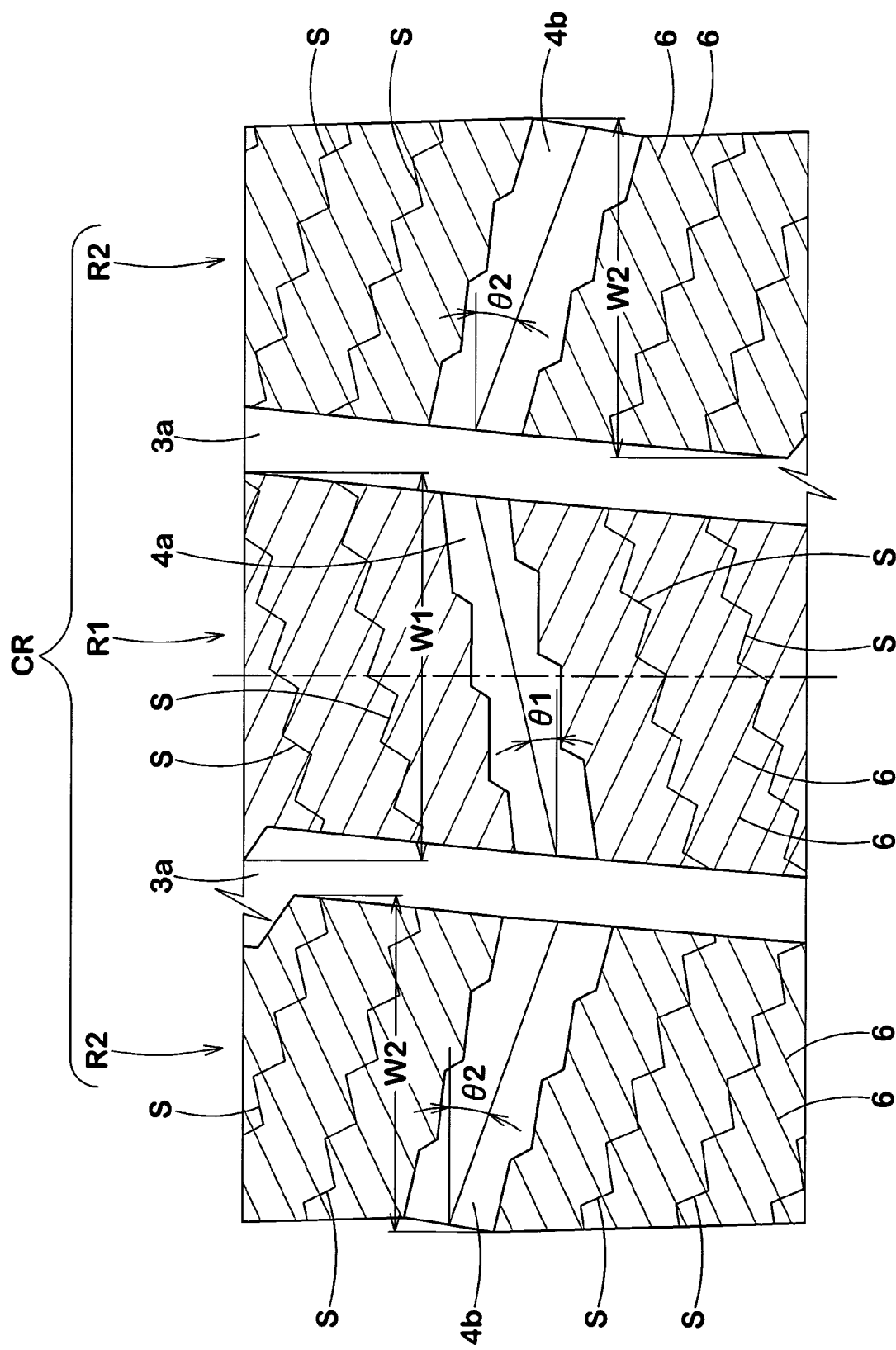
FIG. 6 is a partial enlarged view of crown block rows as shown in FIG. 1.

With respect to the center and side crown lateral grooves 4a and 4b among the lateral grooves 4, if the angles θ1 and θ2 as shown in FIG. 6 are too small, a circumferential component of the edges of these lateral grooves is decreased, so the cornering performance on an icy road cannot be sufficiently enhanced. From such a point of view, the angle θ1 of center crown lateral grooves 4a and the angle θ2 of side crown lateral grooves 4b are preferably at least 12°, more preferably at least 15°.

In the embodiment shown in the drawings, the angle θ1 of center crown lateral grooves 4a disposed in the center crown block row R1 is smaller than the angle θ2 of side crown lateral grooves 4b disposed in the side crown block rows R2 located on the both sides of the center row R1. In case of running on an icy road, the ground contact area of the shoulder regions is small even during cornering. The grip force at the time of cornering on an icy road can be enhanced by making the angle θ2 of side crown lateral grooves 4b relatively large as compared with the angle θ1 of center crown lateral grooves 4a. In order to ensure this action, it is preferable that the ratio (θ2/θ1) of the angle θ2 of side crown lateral grooves 4b to the angle θ1 of center crown lateral grooves 4a is more than 1, especially at least 1.7. On the other hand, if the θ2/θ1 ratio is too large, uneven wear is easy to occur. Therefore, it is preferable that the θ2/θ1 ratio is at most 2.5, especially at most 2.2.

Figure 7:
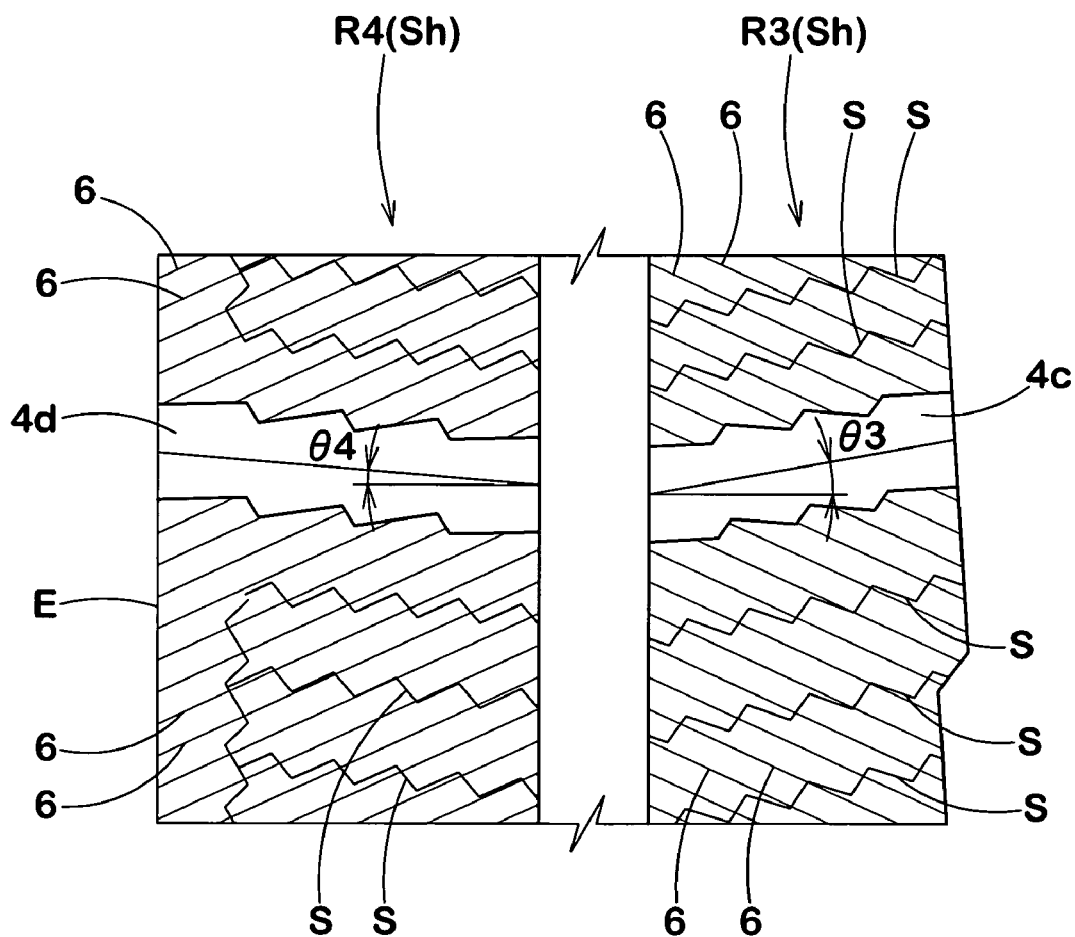
FIG. 7 is a partial enlarged view of shoulder block rows as shown in FIG. 1.

With respect to the inner and outer shoulder lateral grooves 4c and 4d among the lateral grooves 4, if the angles θ3 and θ4 as shown in FIG. 7 are excessively large, there is a possibility that the driving force is not sufficiently obtained at the time of straight running on a snow-covered road. From such a point of view, the angle θ3 of inner shoulder lateral grooves 4c and the angle θ4 of outer shoulder lateral grooves 4d are preferably from 0 to 15°.

In the embodiment shown in the drawings, for the purpose of preventing uneven wear, the outer shoulder lateral grooves 4d disposed in the outer shoulder block row R4 are formed to have a smaller angle θ4 than the angle θ3 of the inner shoulder lateral grooves 4c disposed in the inner shoulder block row R3.

In the present invention, at least one sipe S, preferably a plurality of sipes S, are provided in each of blocks B. The sipes S are formed as slit-like incisions having such a narrow width that both walls of a sipe come into contact at the time of running. It is preferable that the width of sipes S is from about 0.3 to about 1.0 mm. The depth of the sipes S is preferably at least 3.0 mm, more preferably at least 5 mm. If the depth of sipes S is less than 3.0 mm, the edge effect on an icy road is not sufficiently obtained. If the depth of sipes S is too large, there is a possibility that the rigidity of blocks B is excessively lowered. Therefore, the depth is preferably not more than 100%, more preferably not more than 80%, of the maximum depth of lateral grooves 4.

The sipes S may be formed in various forms such as straight line, wave, zigzag and combinations thereof. Zigzag sipes as shown in the drawings are preferred.

The tread portion 2 of the studless tire according to the present invention may be provided with linear incisions. In the embodiment shown in the drawings, a plurality of incisions 6 are provided at intervals in each block B of each block row wherein the incisions 6 extend in the opposite direction to the inclination of the lateral grooves 4 (and the sipes S) provided in that block row with respect to the axial direction. The incisions 6 have a width of 0.1 to 2.0 mm and a depth of 0.1 to 2.0 mm.

Such incisions 6 are helpful in enhancing a grip on an icy road by the edges thereof as well as sipes S and also in increasing the coefficient of road surface friction by absorption of water on an icy road. Since the incisions 6 are formed to have a smaller depth than the sipes S, they are helpful particularly in enhancing initial performances of a fresh tire in an early stage of use. Further, since the incisions 6 are formed to incline in the reverse direction to the sipes S with respect to the axial direction, they effectively exhibit the edge effect for roads in various states.

If the width or depth of incisions 6 is less than 0.1 mm, the above-mentioned actions are not sufficiently exhibited since the incisions are too small. If the width or depth is more than 2.0 mm, there is a possibility that the rigidity of block B is excessively lowered, resulting in occurrence of rubber chipping and uneven wear.

While an embodiment of the present invention has been described with reference to the drawings, it goes without saying that the present invention is not limited to only a tread pattern as mentioned above, and variously modified tread patterns are applicable.

The present invention is more specifically described and explained by means of the following examples. It is to be understood that the present invention is not limited to these examples.

EXAMPLES

Studless tires for passenger cars (size: 195/65R15) having a tread pattern shown in FIG. 1 were manufactured based on specifications shown in Table 1 and described below. The groove area rates were adjusted by suitably changing the groove widths within the ranges described below.
Tread width TW: 160 mm
Groove width Tg1 of inner circumferential groove: 3.5 to 4.2 mm
Groove depth Tg2 of middle circumferential groove: 2.0 to 4.0 mm
Groove width Tg3 of outer circumferential groove: 6.7 mm
Groove width of center crown lateral groove: 3.8 to 4.8 mm
Groove width of side crown lateral groove: 5.0 to 6.4 mm
Groove width of inner shoulder lateral groove: 5.8 to 7.4 mm
Groove width of outer shoulder lateral groove: 6.0 to 7.5 mm
Depth of inner circumferential groove: 10.1 mm
Depth of middle circumferential groove: 7.2 mm
Depth of outer circumferential groove: 10.1 mm
Depth of center crown lateral grooves: 8.0 mm
Depth of side crown lateral grooves: 7.5 mm
Depth of inner shoulder lateral grooves: 8.5 mm
Depth of outer shoulder lateral grooves: 10.1 mm
Width of sipes: 0.4 mm
Depth of sipes: 8.0 mm
Width of incisions: 0.5 mm
Depth of incisions: 0.5 mm The studless tires were tested by the following methods.
<Running Performances on Icy and Snow-Covered Roads>

The tires were attached to a 2,000 cc FR car made in Japan. The car was run on an icy road or a snow-covered road in each test course, and performances such as steering wheel responsibility, cornering stability and feeling of grip were evaluated by a professional test driver's feeling. The results are shown by an index based on Comparative Example 1 being 100. The lager the value, the better.
<Wear Resistance>

The test car mentioned above was run 8,000 km on a dry asphalt road. With respect to each of block rows, the amount of wear (average value) of the both circumferential edge portions of a block and the amount of wear of a center portion of the block were measured, and the difference between them was obtained. The measurement was made with respect to three blocks on the tire circumference for each block row, and the average value was obtained. The results are shown by an index of the reciprocal of the obtained average value based on Comparative Example 1 being 100. The larger the value, the better the wear resistance.

The results are shown in Table 1.

In the table is observed a significant improvement in the running performances on icy and snow-covered roads with respect to that the tires of the Examples according to the present invention. It is also confirmed that the wear resistance is comparable to that of a conventional tire.

TABLE 1

|  | Com. Ex. 1 | Com. Ex. 2 | Ex. 1 | Ex. 2 | Ex. 3 | Com. Ex. 3 |
|---|---|---|---|---|---|---|
| Groove area rate Gs of shoulder region (%) | 31.0 | 31.5 | 32.0 | 32.5 | 33.5 | 35.0 |
| Groove area rate Gc of crown region (%) | 31.0 | 30.0 | 29.0 | 28.5 | 28.0 | 27.0 |
| Groove area rate of whole tread portion (%) | 31.0 | 31.0 | 31.0 | 31.0 | 31.0 | 31.0 |
| Difference (Gs − Gc) (%) | 0 | 1.5 | 3.0 | 4.0 | 5.5 | 8.0 |
| Running performances on icy road (index) | 100 | 100 | 105 | 108 | 110 | 112 |
| Running performances on snow-covered road (index) | 100 | 100 | 105 | 108 | 108 | 108 |
| Wear resistance (index) | 100 | 100 | 100 | 100 | 98 | 90 |

What is claimed is:

1. A studless tire comprising
a tread portion having tread edges and a tread width therebetween, the tread portion provided with
a middle circumferential groove disposed on each side of the tire equator to have a center line located in a region between 15% and 25% of the tread width from the tire equator,
at least one inner circumferential groove disposed in a crown region defined between the middle circumferential grooves, and
at least one linear outer circumferential groove disposed in each of a pair of shoulder regions defined between the middle circumferential grooves and the tread edges,
said crown region provided with at least two rows of circumferentially arranged crown blocks defined by crown lateral grooves,
each said shoulder region provided with at least two rows of circumferentially arranged shoulder blocks defined by shoulder lateral grooves,
wherein
each said inner circumferential groove is a zigzag groove composed of alternate long components and short components, wherein each of the long components and two adjacent lateral grooves which are one of the crown lateral grooves axially inwardly adjacent to the long component and one of the crown lateral grooves axially outwardly adjacent to the long component, form a cross-shaped groove-intersecting portion,
said middle circumferential groove is a zigzag groove composed of alternate short components and long components, wherein each of the long components and one of the axially outwardly adjacent shoulder lateral grooves, form a T-shaped groove-intersecting portion, and each of the short components and one of the axially inwardly adjacent crown lateral grooves, form a T-shaped groove-intersecting portion,
said middle circumferential groove has only said T-shaped groove-intersecting portions, whereas each said inner circumferential groove has only said cross-shaped groove-intersecting portions,
the crown blocks and the shoulder blocks are each provided with sipes, and
the rate Gs in % of the grooved area of the shoulder regions is larger than the rate Gc in % of the grooved area of the crown region so that the difference (Gs−Gc) in value therebetween is in a range of from 3 to 7.

2. The studless tire of claim 1, wherein each of the middle, inner and outer circumferential grooves has an axial width within the range of 1.0 to 10.0 mm, and the groove width Tg3 of the outer circumferential groove is larger than the groove width Tg1 of the inner circumferential groove.

3. The studless tire of claim 1, wherein each of the crown and shoulder lateral grooves has a width within the range of 3.0 to 10.0 mm measured in the circumferential direction, and the groove width of the shoulder lateral groove is larger than the groove width of the crown lateral groove.

4. The studless tire of claim 1, wherein
the crown and shoulder lateral grooves each extend at an angle of 0 to 45 degrees with respect to the axial direction, so that the angle of the shoulder lateral grooves is smaller than the angle of the crown lateral grooves.

5. The studless tire of claim 1, wherein
the groove width of the middle circumferential grooves is from 1.0 to 4.0 mm and is smaller than the groove widths of the inner and outer circumferential grooves, and the crown lateral grooves and the shoulder lateral grooves, which communicate with each of the middle circumferential grooves are staggered.

6. The studless tire of claim 5, wherein the middle circumferential grooves have a width varied in the circumferential direction, and have the maximum groove width at locations where the crown lateral grooves communicate with the middle circumferential grooves.

7. The studless tire of claim 1, wherein
said at least one inner circumferential groove is a pair of the inner circumferential grooves disposed one on each side of the tire equator so that said at least two rows provided in the crown region are a center crown block row extending on the tire equator and a pair of side crown block rows disposed one on each side of the center crown block row, and
the inclination angle $\theta 1$ of the crown lateral grooves disposed in the center crown block row with respect to the axial direction is smaller than the inclination angle $\theta 2$ of the crown lateral grooves disposed in the side crown block rows with respect to the axial direction.

* * * * *